J. F. Cass. Wheeled Vehicle.

117257

PATENTED JUL 25 1871

Witnesses:
A. Bennenendorf
Wm. H. C. Smith

Inventor:
J. F. Cass
per Munn & Co.
Attorneys.

UNITED STATES PATENT OFFICE.

JAMES F. CASS, OF L'ORIGNAL, CANADA.

IMPROVEMENT IN WHEELED VEHICLES.

Specification forming part of Letters Patent No. 117,257, dated July 25, 1871.

*To all whom it may concern:*

Be it known that I, JAMES F. CASS, of L'Orignal, in the Province of Ontario and Dominion of Canada, have invented a new and useful Improvement in Wheeled Vehicles; and I do hereby declare that the following is a full, clear, and exact description thereof, which will enable others skilled in the art to make and use the same, reference being had to the accompanying drawing forming part of this specification, in which—

Figure 1:
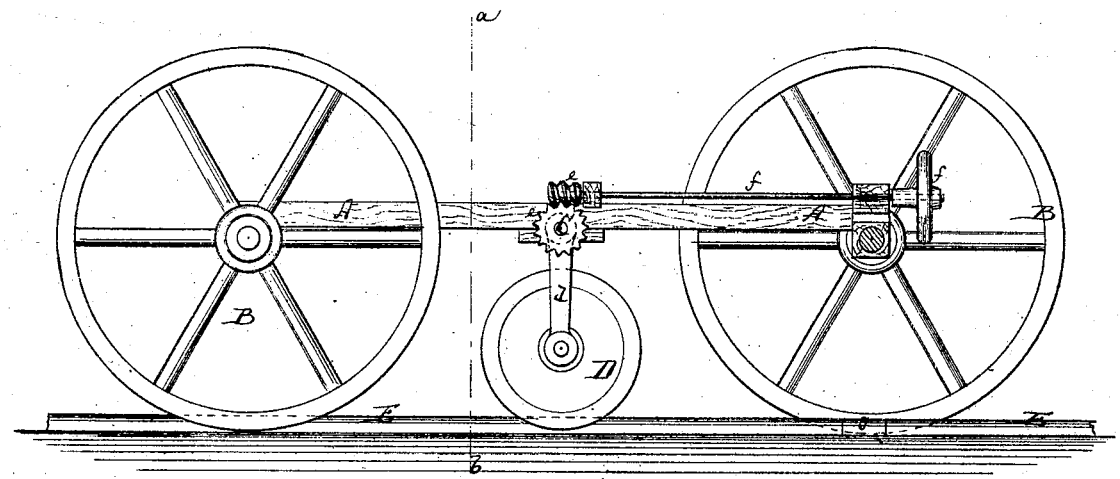
Figure 2:
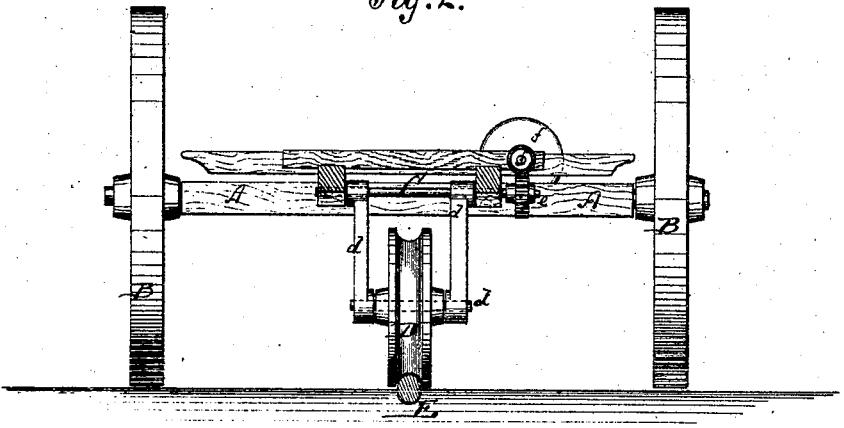

Figure 1 represents a side elevation, partly in section, of a wagon provided with my improvement. Fig. 2 is a vertical transverse section of the same on the line $a$ $b$, Fig. 1.

Similar letters of reference indicate corresponding parts.

This invention has for its object to provide means for reducing the draft of wheeled vehicles, and consequently lessening the wear and tear of the rolling-gear and the fatigue of the draft animals. The invention consists in the application to the under side of a wagon or other vehicle of a pivoted frame carrying a grooved wheel which can be let down to run on a single rail and relieve the outer wheels from the main weight. The entire load is thereby more evenly balanced and transferred from a broad to a narrow base.

A in the drawing represents the body of a wagon or other suitable wheeled vehicle. B B are the wheels supporting the same in the ordinary manner. C is a transverse shaft hung in the body A and provided with projecting cranks $d$ whose ends serve to support a grooved wheel, D, under the middle of the body A. The shaft C is, by worm and gear $e$, or otherwise, connected with a shaft and hand-wheel, $f$, whereby it can be turned at will to swing the wheel D to the ground or raise it clear of the same. In connection with this article I propose to use on graded streets or roads a central rail, E, which is laid on the ground, to project somewhat from the same. This rail may be made of wood, or of wood capped with metal, and is laid upon sleepers, bed-rails, or embedded directly in the ground, as may appear most advantageous. The several sections of the rail may be connected by sleeves or sockets $g$, or in other suitable manner. The central wheel D of the vehicle is to be let down upon the rail to sustain the main weight, while the outer wheels serve only to properly balance the entire apparatus. When desired, the wheel D can be swung up clear of the rail to let the load again upon the outer wheels B. Two or more wheels, E, may be applied, one behind the other, to one vehicle.

Having thus described my invention, I claim as new and desire to secure by Letters Patent—

The arrangement of pivoted frame $d$ and grooved wheel D centrally beneath an ordinary road-wagon, so that the latter may be let down upon a single rail E, and thus relieve the ordinary wheels of a large portion of the weight, as described.

JAMES F. CASS.

Witnesses:
 JOHN M. AIRD,
 C. A. CASS.